Nov. 28, 1933.      K. VON SZOMBATHY      1,936,959
PROCESS FOR PRODUCING PURE SULPHUR FROM CRUDE MATERIALS
CONTAINING SULPHUR IN AN UNINTERRUPTED OPERATION
Filed June 26, 1930
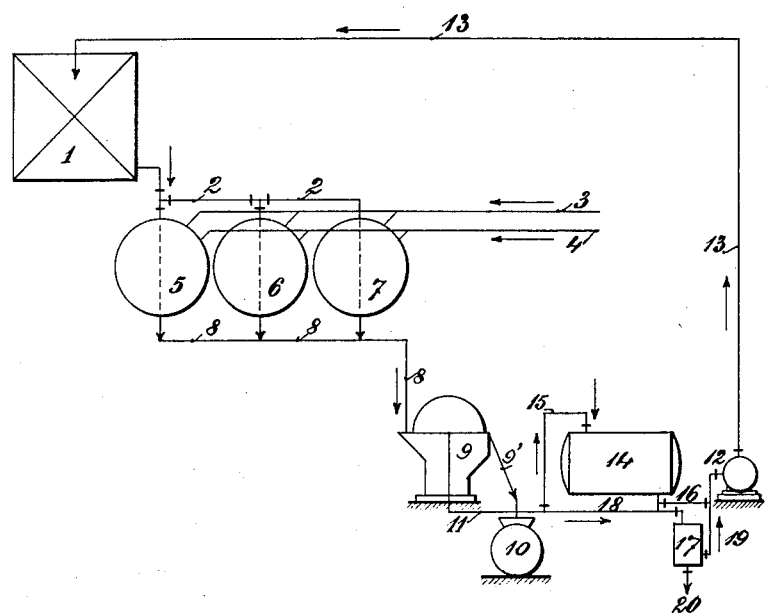
Inventor
Koloman von Szombati
By
Attorney.

Patented Nov. 28, 1933

1,936,959

UNITED STATES PATENT OFFICE 1,936,959

PROCESS FOR PRODUCING PURE SULPHUR FROM CRUDE MATERIALS CONTAINING SULPHUR IN AN UNINTERRUPTED OPERATION

Koloman von Szombathy, Dortmund, Germany

Application June 26, 1930, Serial No. 464,005, and in Switzerland July 8, 1929

4 Claims. (Cl. 23—226)

The proposal has frequently been put forward to use thionates for absorbing sulphuretted hydrogen or sulphur dioxide gas by preferably employing thiosulphates for absorbing sulphuretted hydrogen. In studying polythionic acids and their salts it was ascertained that the higher polythionic acids and polythionates, e. g., tetrathionic acid, show a sulphur-adding action. In this manner it is possible to produce higher sulphur compounds from lower polythionates. The higher polythionates, the pentathionates and hexathionates slowly liberate the sulphur taken up, thus being reduced to tetrathionates. It has been found that this separation of the sulphur takes place in the form of precipitated sulphur. However, if provision is made for the presence of collodial sulphur or sulphur in the nascent state in the solution during the separation of the sulphur, this is readily taken up again by tetrathionates and in favorable circumstances repeatedly given off in the form of precipitated sulphur. According to the invention, the sulphur content of the crude material is converted in the usual manner into sulphuretted hydrogen and sulphur dioxide gases, the gases obtained being at the same time led into a preferably finely distributed concentrated solution of higher polythionates soluble in water, such as alkali or earth alkali salts of pentathionic or hexathionic acids, and the liberated sulphur separated from the salt solution and dried, while the salt solution freed from the precipitated sulphur is constantly returned to the reaction vessel for the further production of sulphur. At the same time, however, the solution takes up the sulphur in the nascent state which is formed by the action of the sulphuretted hydrogen on the sulphurous acid, the tetrathionate being thus regenerated to again form penta-hexathionates. This process may be accelerated by adding small quantities of alcohols, for instance, 1-2 per cent. of glycerine, to the polythionate solution, and further by maintaining the temperature of the fluid, to which the gases mingled with carbon dioxide or carbon oxide are added, at 45 to 65 degrees cent.

The sulphuretted hydrogen and sulphur dioxide should be added in the proportion of 2:4 to 2:7, this having been found to be the correct proportion by way of example according to the nature of the gases.

Whilst the gases are being added, the separation of the sulphur and the regeneration of the solution are effected very rapidly. In other respects the reaction is very tardy. However, if the addition of sulphuretted hydrogen is in excess of the proportion stated, the pentathionate is slowly reduced to the thiosulphate. That should be avoided by all means as the regeneration of the pentathionate from the thiosulphate is a comparatively tardy reaction, and not in the least adapted for continuous service. If there is an excess of sulphurous acid compared with the proportion stated, collodial sulphur is chiefly produced which gradually agglomerates the sulphur already extracted and precipitated. In this condition it is a difficult matter to wash the finished sulphur. Naturally, minor fluctuations occurring during the admission of the gases do no harm as any variation may readily be detected and compensated for.

While the hitherto known processes were chiefly based on the fact that the sulphurous acid is, on the one hand, absorbed by thiosulphate, whereby trithionate and tetrathionate are formed from thiosulphate, and, on the other hand, sulphuretted hydrogen was employed for reducing the aforementioned polythionates, only tetrathionates and pentathionates or hexathionates should be present in the same proportion in the polythionate solution of the new process. Thiosulphate is never present in said solution. Should there be an excess of tetrathionate or pentathionate, it is a sign that the gases were not correctly added.

From the foregoing it will, therefore, be evident that in this case it is not a matter of gas absorption, but that it rather concerns a purely chemical process carried out in the wet state in which the sulphur is separated catalytically from the employed pentathionate solution, and the possibility is given of producing considerable quantities of the solution in a short time.

As the separation of the sulphur and the simultaneous assimilation of the sulphur are uniformly effected by the polythionates, the proportion between the various polythionates remains constant, and the solution possesses a constantly unchanged activity if the addition of the gases is correctly carried through. In case a pentathionate solution exists, it is only necessary to provide for an uninterrupted supply of sulphuretted hydrogen and sulphur dioxide in the correct proportion, and for a separation of the freed precipitated sulphur from the solution by means of a filtering device, and for the solution freed from sulphur being returned to the cycle of the operation. Hence, the separation of the sulphur and the return of the unchanged pentathionate solution are effected in an uninterrupted cycle.

From the foregoing it will be evident that the yield of sulphur depends solely upon the concentration of the gases. When operating with concentrated gases, a stronger pentathionate solution is preferably used. If, on the other hand, the gases are diluted, a diluted pentathionate solution will suffice. It has been found that a 10 per cent. pentathionate solution may still be used to advantage. However, dilution to such a degree appears to lie almost at the lowest limit at which the operation pays.

The process is chiefly adapted for producing large quantities of sulphur from different crude substances with sulphur content, or also from crude sulphur. Consequently, only crude materials capable of being easily gasified, such as sulphur ores, pyrites, sulphide of zinc, copper pyrites, sulphide of lead, crude sulphur, gas purifying masses, etc. come chiefly under consideration.

Potassium salts are adapted more than any other salts for preparing a pentathionate solution. Ammonium salt (sal ammoniac) is least adapted for carrying out the process as the temperature is constantly maintained at 60 degrees and higher as long as the process lasts, and greater losses would have to be reckoned with after some time on account of the moisture of the ammonium salt.

Regarding the supply of gas, it is quite immaterial whether the two gases are conducted into the pentathionate solution in the mixed or separated state. The main thing is that the supply is effected simultaneously and in the correct proportion.

The accompanying diagrammatic drawing of a plant for carrying out the process embodying the invention, and the following description of a practical application of the process, will suffice to make the sequence of operations clear without any further theoretical explanations being necessary.

A potassium-pentathionate solution of 30–32 degrees Bé. is prepared in that equal volumes of sulphuretted hydrogen and sulphurous acid are made to pass into the potash lye up to the point of saturation, the solution being stored in the container 1. The solution is gradually led through the pipe 2 into the absorbers 5—7 where it is finely sprayed. Into this finely distributed pentathionate solution sulphuretted hydrogen and sulphur dioxide are introduced through the gas pipes 3 and 4. Owing to the reaction heat, the solution becomes heated to about 60 degrees cent., and this temperature is maintained at a constant level. Whilst the gas is being admitted, the fine, precipitated sulphur is immediately separated and passes through the pipe 8 into the filtering device 9 where the separated sulphur is washed. Thereupon the washed pure but still moist sulphur is delivered into the dryer 10 through the pipe 9'. The filtrate product is forced back again into the container 1 through the pipes 11, 12 and 13, whereby preferably a collecting vessel 14 with the pipes 15 and 16, or a steaming vessel 17 with the pipes 18 and 19 may be interposed. The vessel 17 is also intended to serve as a collector for the washing liquor of the separated sulphur, the liquor being then run off through the drain pipe 20.

What I claim is:—

1. The process for producing pure sulphur from crude material containing sulphur, in a continuous operation, which comprises producing hydrogen sulphide and sulphur dioxide from the crude material, and conducting said sulphide and dioxide simultaneously into a polythionate solution as a washing fluid, the hydrogen sulphide being introduced in excess of more than a molecular equivalent with respect to the amount of sulphur dioxide in order to obtain a stated hydrogen sulphide tension in an absorber, and the solution being maintained at a temperature of between 45°–65° C. in a continuous closed cycle.

2. A process according to claim 1, in which the polythionate solution contains a small amount of alcohol.

3. A process according to claim 1, in which the polythionate solution contains a small amount of glycerine.

4. A process according to claim 1, in which at least twice as much hydrogen sulphide as sulphur dioxide is utilized at a temperature between 45°–65° C. in the closed cycle.

KOLOMAN von SZOMBATHY.